June 20, 1967  E. N. MURRAY  3,326,201
BARBECUE APPARATUS
Filed July 30, 1964  9 Sheets-Sheet 3

INVENTOR
EDGAR N. MURRAY

BY
Strauch, Nolan & Neale
ATTORNEYS

June 20, 1967   E. N. MURRAY   3,326,201
BARBECUE APPARATUS
Filed July 30, 1964   9 Sheets-Sheet 4

INVENTOR
EDGAR N. MURRAY

BY
Strauch, Nolan & Neale
ATTORNEYS

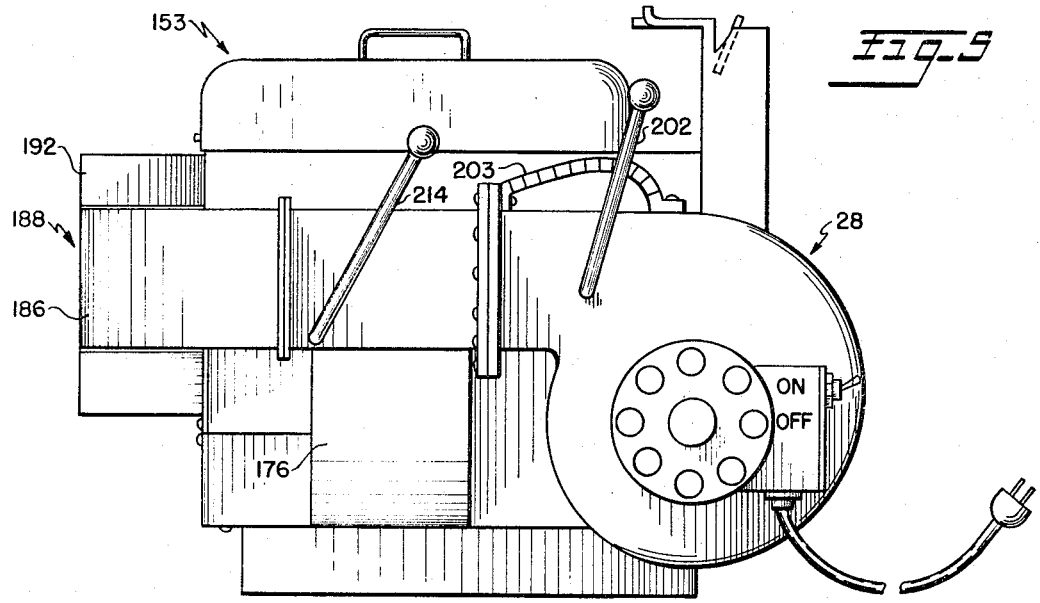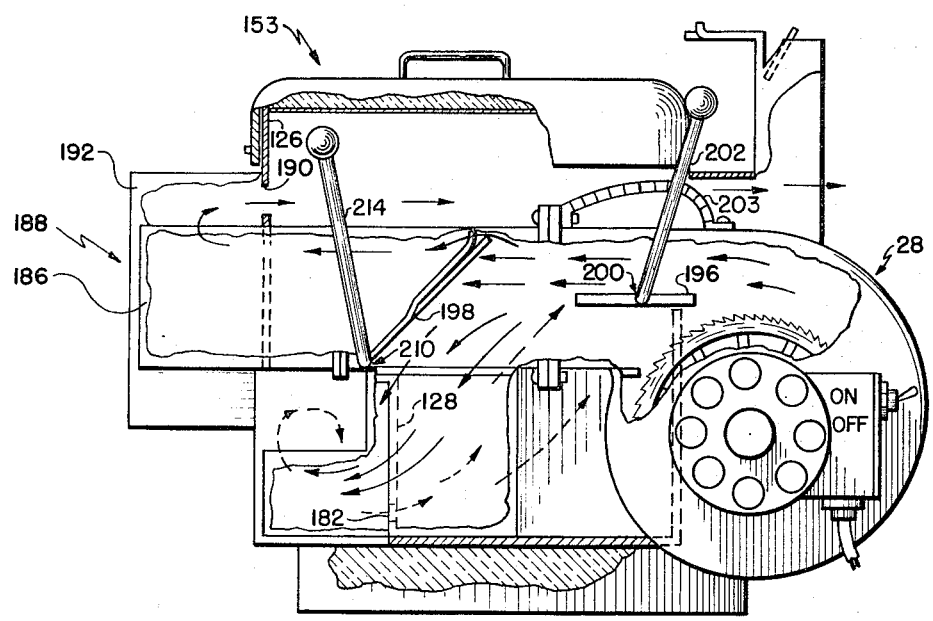

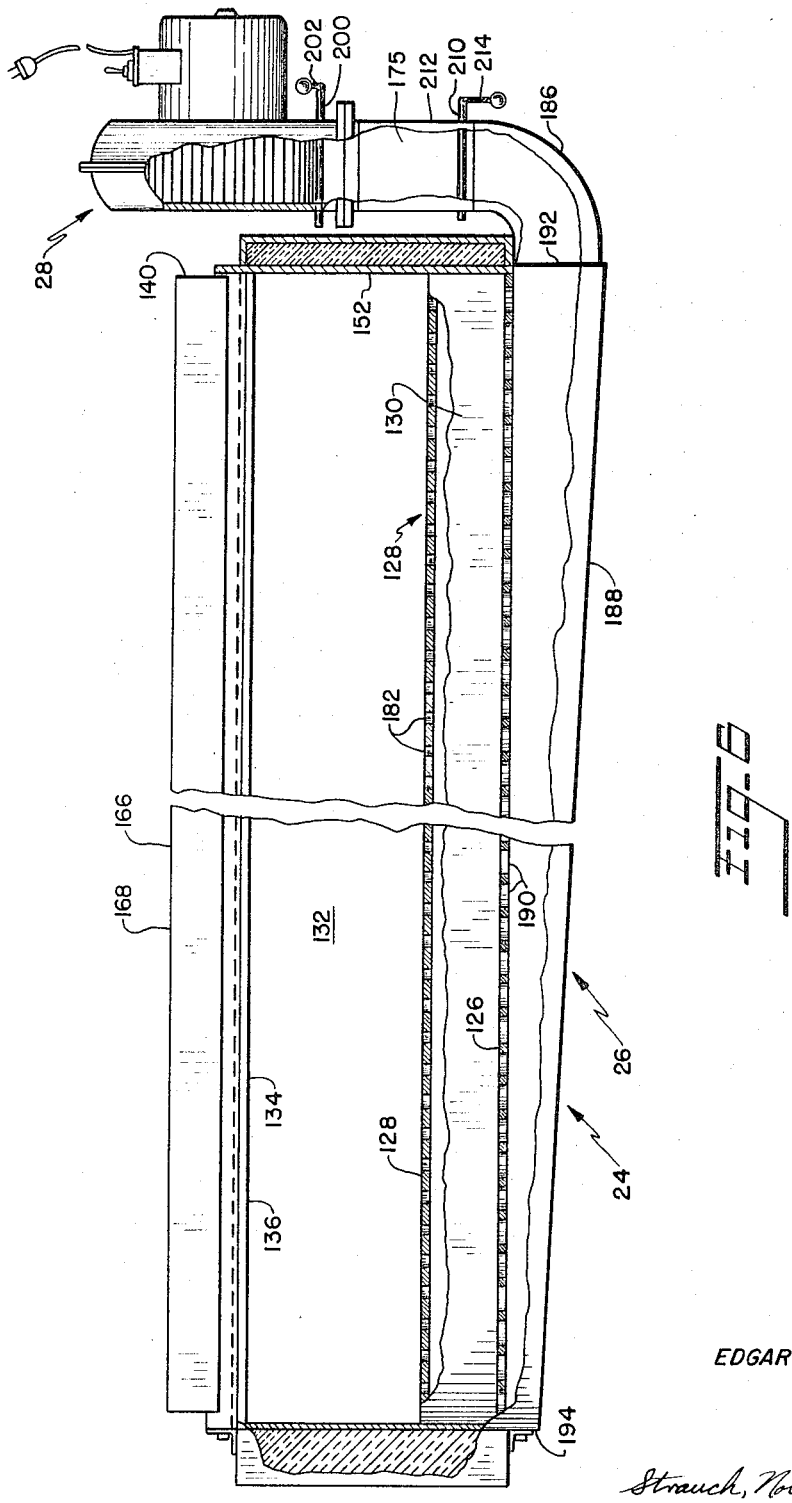

June 20, 1967  E. N. MURRAY  3,326,201
BARBECUE APPARATUS
Filed July 30, 1964   9 Sheets-Sheet 7
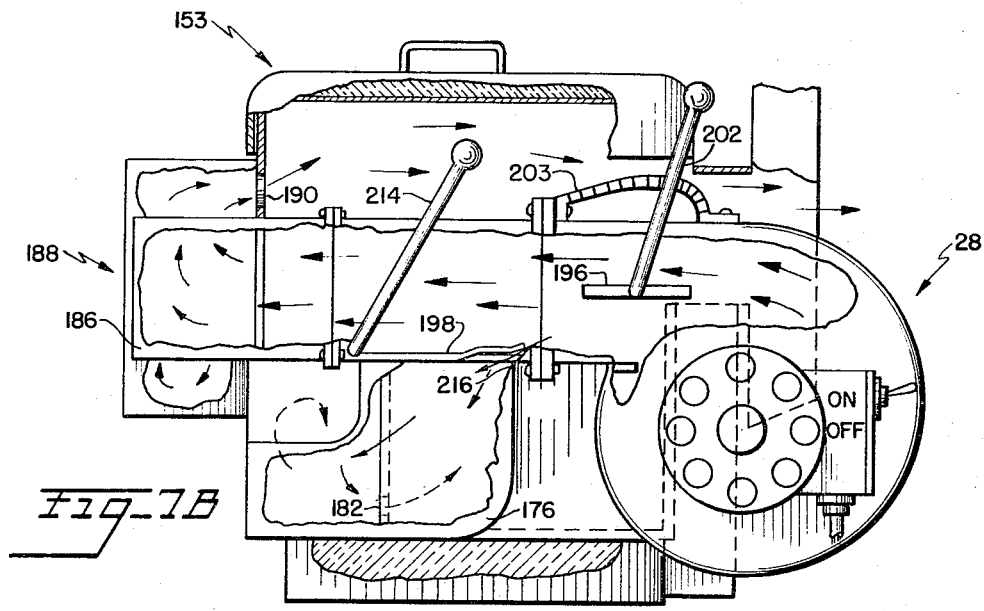
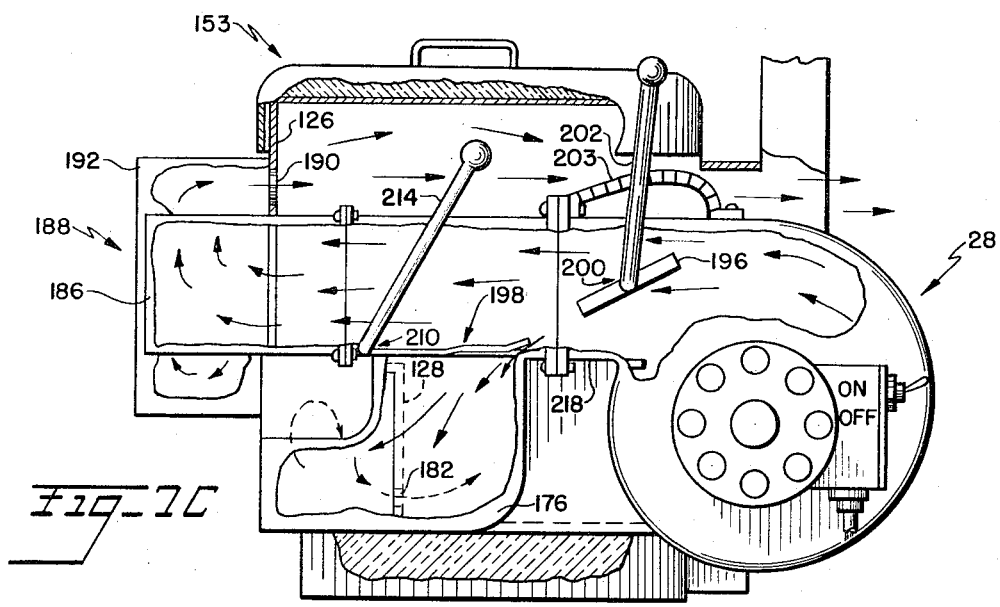
INVENTOR
EDGAR N. MURRAY
BY Strauch, Nolan & Neale
ATTORNEYS

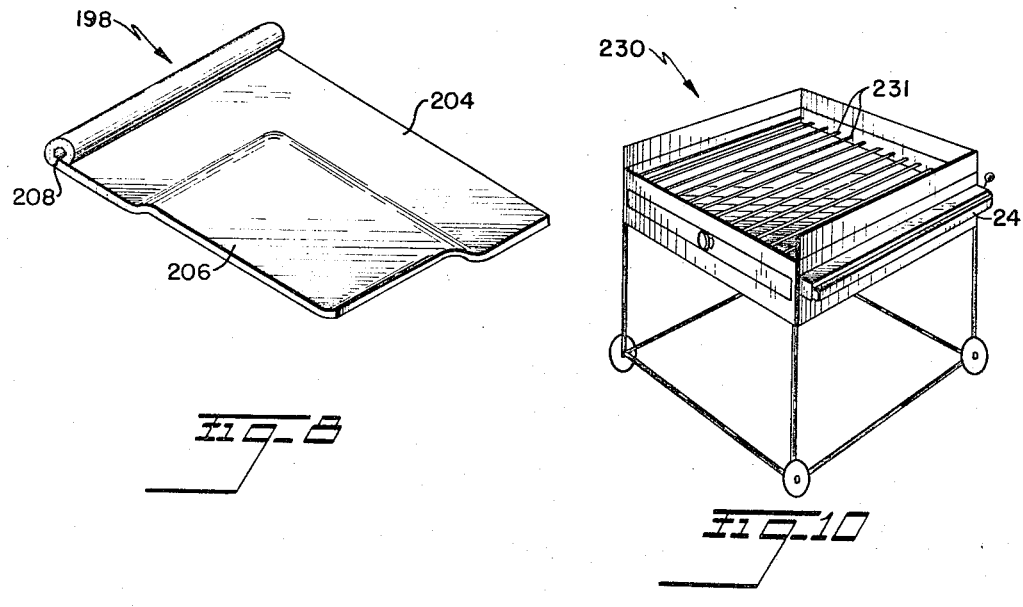
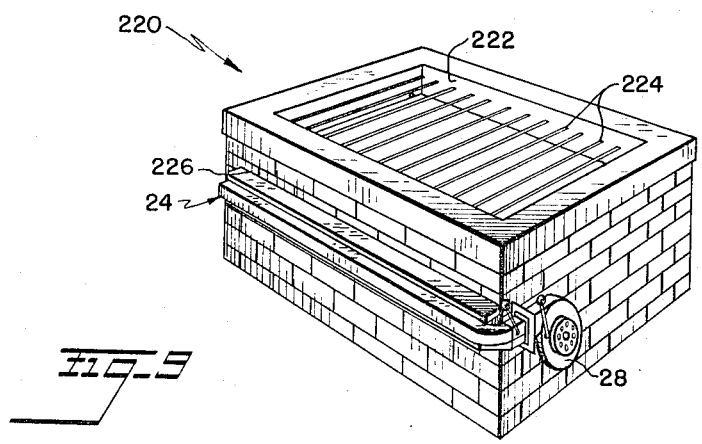

June 20, 1967  E. N. MURRAY  3,326,201
BARBECUE APPARATUS

Filed July 30, 1964  9 Sheets-Sheet 9

INVENTOR
EDGAR N. MURRAY

BY *Strauch, Nolan & Neale*

ATTORNEYS 3,326,201
BARBECUE APPARATUS
Edgar N. Murray, 10213 Kensington Parkway,
Kensington, Md. 20795
Filed July 30, 1964, Ser. No. 386,195
5 Claims. (Cl. 126—25)

This invention relates to barbecue apparatus and, more particularly, to barbecue apparatus of the indirect type.

Comestibles (generally meats) are conventionally barbecued on racks placed above a firebox adapted to contain charcoal or other fuel or an electrical heating element. Those components are, in some cases, enclosed to confine the smoke and the like generated during the barbecuing process.

That previously known type of barbecuing apparatus has a number of disadvantages, and it is one primary object of this invention to provide novel barbecue apparatus in which these disadvantages are eliminated.

Specifically, in conventional barbecue apparatus of the type just described, fat rendered from meat as it cooks drips down into the fire or onto the heat element, creating a number of serious problems. One of the most important of these is that of keeping the apparatus clean. Part of the grease rendered from the meat being cooked congeals in the firebox itself, necessitating frequent cleaning of the latter. This is a difficult, arduous, messy task and tends to discourage the use of such apparatus.

Other portions of the grease are vaporized or burned by the fire or heating element and converted into a heavy oily smoke which rises through the apparatus and settles out on the interior of the apparatus in the form of greasy deposits which become even more pernicious by the entrapment of fly ash and other foreign substances. Such deposits must be promptly removed as they are unsanitary and pose a serious fire threat. The latter problem is particularly acute in commercial barbecuing apparatus in which grease duct fires are common and insurance rates are therefore extremely high.

The burning grease also poses a fire hazard because of "flare-ups" of the grease as it drips onto the burning fuel or hot heating element, vaporizes, and ignites. The danger of fire from flare-ups is sufficiently great that, in commercial installations where several hundred pounds of meat may be barbecued at a time, a person must continuously watch the barbecue oven to prevent a fire from starting. As it commonly takes all day to barbecue a batch of meat, the necessity of keeping the barbecue oven or pit under surveillance adds substantially to the cost of the barbecued meat and may even make it uneconomical to produce.

Another disadvantage of flare-ups is that the flame of the burning grease and its combustion products contact and scorch and otherwise affect the taste of the meat. Such meat has a distinctly inferior taste in comparison to that which is not contacted with flame or greasy combustion products during cooking and which does not have the scorched, greasy taste of meat barbecued in conventional apparatus. There is also substantial evidence that the combustion products resulting from the burning of the grease and deposited on the meat being barbecued contain significant amounts of carcinogenous (i.e., cancer causing) chemicals (see page 24 of the July 4, 1964, issue of the Washington Daily News). Thus, meat barbecued in conventional apparatus may be extremely dangerous to eat as well as being inferior in taste, texture, and color.

The seriousness of grease and flame or heating element contact in conventional barbecue ovens is apparent from the large quantities of grease involved. For example, in barbecuing 125 pounds of pork shoulder, on the order of 30 pounds (four gallons) of grease will be rendered from the meat as it cooks.

I have now invented barbecue apparatus which eliminates the problems just discussed by a novel construction in which the grease rendered from the meat as it cooks does not contact the burning fuel or any portions of the apparatus hot enough to vaporize or burn the grease and is quickly drained from the apparatus so that the problems resulting from the burning and vaporization of grease in conventional barbecue apparatus are entirely absent. My invention is characterized by a novel heating unit which is separate from the pit, oven, or grill where the meat is placed and out of contact with the drippings. The meat is actually cooked by heated air which passes through the firebox and over the burning fuel therein and then into the pit, oven or grill where the meat is located and upwardly through the rack or other support on which the meat is placed. The drippings drain to the bottom of the pit, oven, or grill and are removed.

As suggested above, one extremely important advantage of this invention is that vaporization and burning of the grease rendered from the meat during the barbecuing process is eliminated since the grease never reaches a temperature at which this would occur. Consequently, the barbecue apparatus I have invented is much easier to keep clean than that of the conventional type since there is no firebox to clean grease from and no greasy smoke to form deposits in the meat compartment. And, because the heating unit is separate from the cooking unit, the lower portion of the latter may be made of a simple configuration so that the small portion of drippings adhering to it can be readily removed.

Since there is no burning grease in the present invention, there is no fire hazard. Consequently, there is no need to keep it under surveillance so that the labor costs associated with the use of this apparatus are materially lower and meat may be more economically barbecued in commercial applications of my invention. Also, because the fire hazard is eliminated, insurance rates may be substantially lower for establishments employing the present invention than for those which have barbecue apparatus of the conventional type.

In addition, my invention is capable of producing barbecued meat which has better flavor, texture and color than that produced in conventional barbecue apparatus. And, because there is no burning grease, there is no formation of carcinogens; and the potential health hazard of conventionally barbecued meats is therefore not present.

Another extremely important advantage of the present invention is that, because of its novel firebox construction, efficient, essentially smokeless combustion of fuel can be obtained. Because of this and the elimination of smoke from burning fat, filters, vent fans, and the like are unnecessary and only the barest amount of venting is required. This is of considerable economic importance in commercial installations due to the elimination of the heretofore necessary hoods and ductwork and is also important in applications for home use since it makes indoor of my novel barbecue apparatus completely practical.

Another important advantage of the present invention is its versatility. Its principles are equally applicable to large commercial installations and to small portable units for home and other use. Also, my novel heating units may be employed with a variety of cooking devices such as ovens, grills, and open barbecue pits.

Barbecue and other cooking apparatus of the indirect type has been proposed from time to time in the past as evidenced by U.S. Patent Nos. 1,595,846 issued Aug. 10, 1926, to Wood for Barbecue Oven; 1,896,192 issued Feb. 7, 1933, to Cain for Barbecue Oven; 2,891,465 issued June 23, 1959, to Rogge for Barbecue Device; and 2,961,942 issued Nov. 29, 1960, to Terry for Fireplace Grill. To my knowledge, however, none of these prior art devices has ever been manufactured or gained consumer acceptance; and they all lack a number of features of the present invention such as simplicity, versatility, efficiency, foolproof operation and others discussed above.

From the foregoing, it will be apparent that another important object of the present invention resides in improved barbecue apparatus of the indirect type in which vaporization and burning of grease rendered from the meat during the cooking process is eliminated.

In conjunction with the foregoing objects, other objects of the present invention include the provision of novel improved barbecue apparatus, which:

(1) is materially easier to keep clean than conventional barbecue apparatus;
(2) is free of fire hazards;
(3) may be more economically operated in commercial applications than conventional apparatus;
(4) is capable of producing barbecued meat having better flavor, texture, and color than can be produced in conventional apparatus;
(5) eliminates the formation of carcinogens and therefore produces barbecued meat which is free from these cancer causing agents;
(6) does not require the hoods, large vent ducts, vent fans, and the like which conventional commercial barbecue apparatus must use to comply with fire and health regulations;
(7) is suitable for use indoors in homes; and
(8) is simpler and less expensive to manufacture, more versatile, and more foolproof than prior barbecue apparatus of the indirect type and more capable of gaining consumer acceptance than these prior art devices.

Another important and specific object of the present invention is the provision of novel barbecue apparatus heating units which may be used with a variety of cooking units such as barbecue ovens, open pits, grills, and the like.

Additional objects and further novel features of the present invention will become apparent from the appended claims and as the ensuing detailed description and discussion proceeds in conjunction with the accompanying drawing, in which:

FIGURE 5 is a right end view of the cooking unit;

FIGURE 6 is a horizontal section through the heating unit;

FIGURE 7A is a view similar to FIGURE 5 with part of the air distribution structure employed in the heating unit broken away to show the pattern of air flow and the setting of the valves controlling this pattern when a fire is started in the firebox of the heating unit;

FIGURE 7B is a view similar to FIGURE 7A showing a pattern of air flow and valve settings which provide a high rate of flow of heated air into the cooking unit;

FIGURE 7C is a view showing a pattern of air flow and valve settings which provide a low rate of flow of heated air into the cooking unit;

FIGURE 8 is a perspective view of an air flow proportioning valve employed in the heating unit's air distribution system;

FIGURE 9 is a perspective view of an open pit barbecue apparatus constructed in accord with the principles of the present invention;

FIGURE 10 is a perspective view of a portable outdoor-indoor home type barbecue grill equipped with an indirect heating unit in accord with the principles of the present invention.

Figure 1:
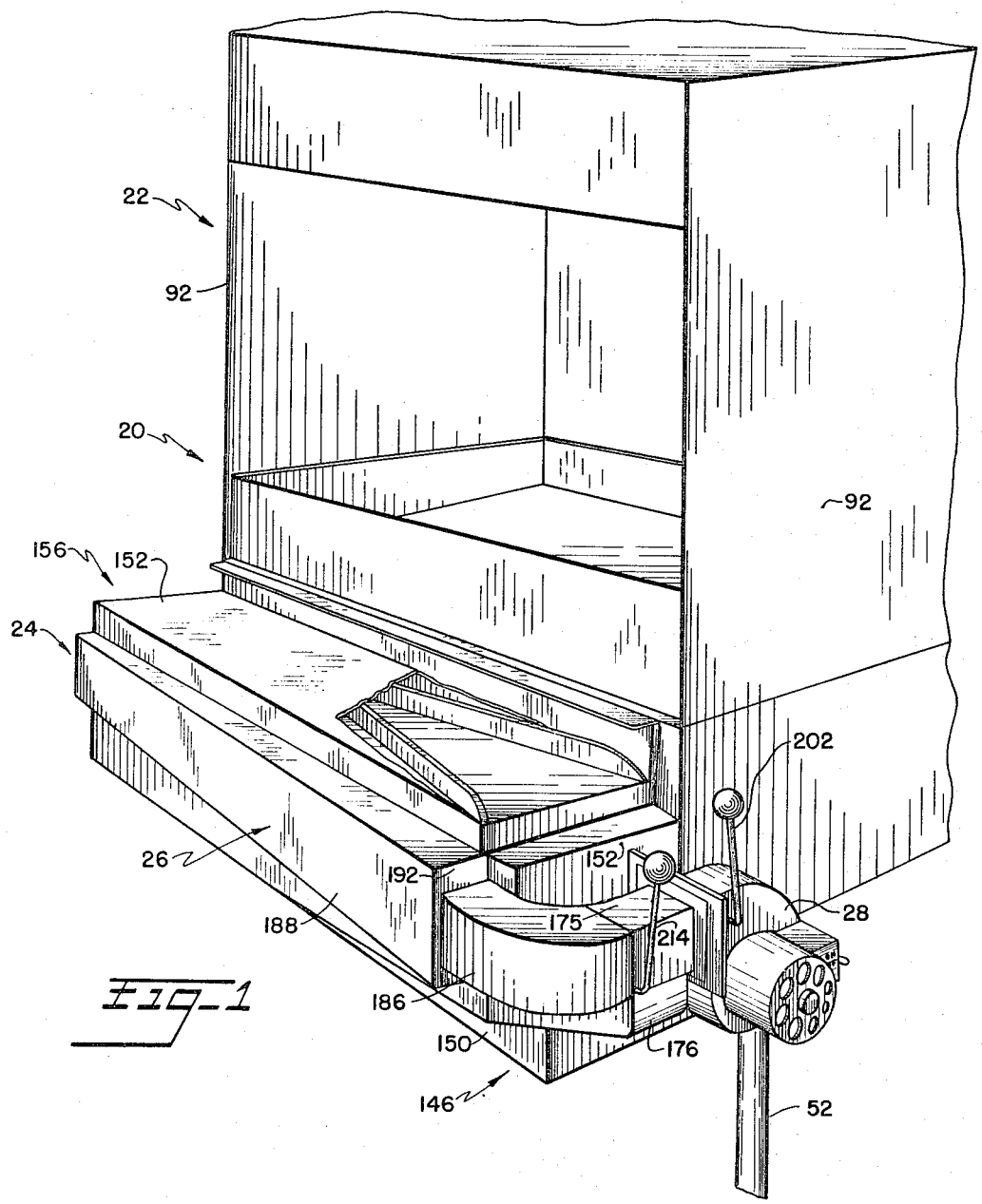
FIGURE 1 is a fragmentary perspective view of barbecue apparatus constructed in accord with the principles of the present invention, components such as meat racks, oven doors and the like being removed for the sake of clarity.

Referring now to the drawing, FIGURE 1 illustrates barbecue apparatus 20 constructed in accordance with the principles of the present invention and composed of a cooking unit 22 and a heating unit 24 which includes a firebox 26 and a blower 28 and is supported from cooking unit 22 at the bottom and to one side of the cooking unit. The blower supplies combustion air to firebox 26, and in addition, blows air across the fuel bed where it is heated and mingled with gases liberated from the fuel and generated by the combustion process. From firebox 26 the heated gases flow into and upwardly through cooking unit 22, cooking the meat or other comestibles, which are suspended in the cooking unit on a suitable support such as the illustrated rack 30 (see FIGURES 2 and 3).

The grease rendered from the meat as it cooks drips into a pan 32 in the bottom of cooking unit 22 and drains through a pipe 34 into a suitable receptacle (not shown) so that it never contacts the burning fuel. As discussed above, this latter feature is of substantial importance as it eliminates the fire hazard of conventional apparatus, makes the novel apparatus disclosed herein much easier to clean, and results in the production of an improved and safer product at lower cost.

Figure 2:
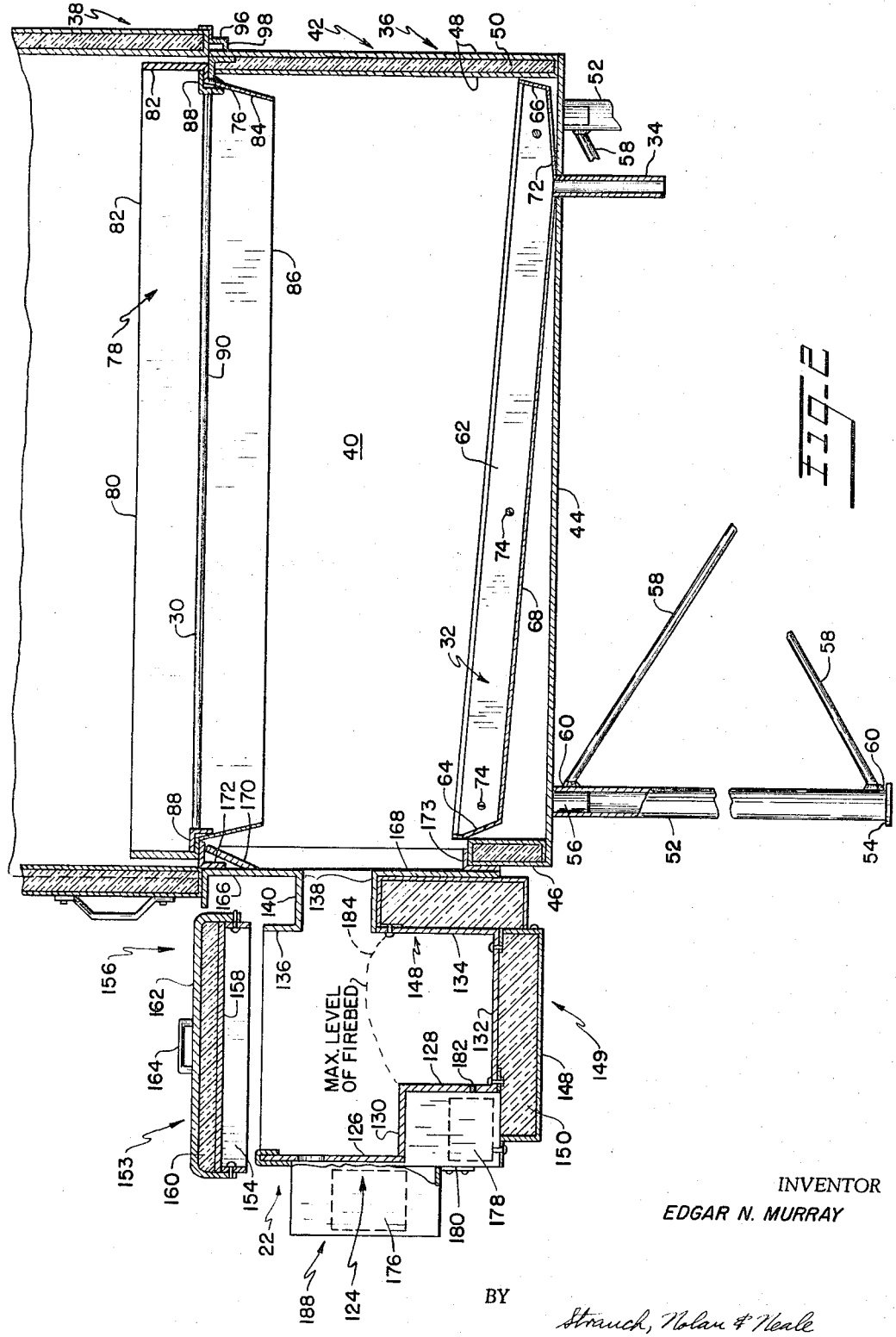
FIGURE 2 is a vertical section through the heating unit and the heat basin of the cooking unit employed in the apparatus of FIGURE 1.
Figure 3:
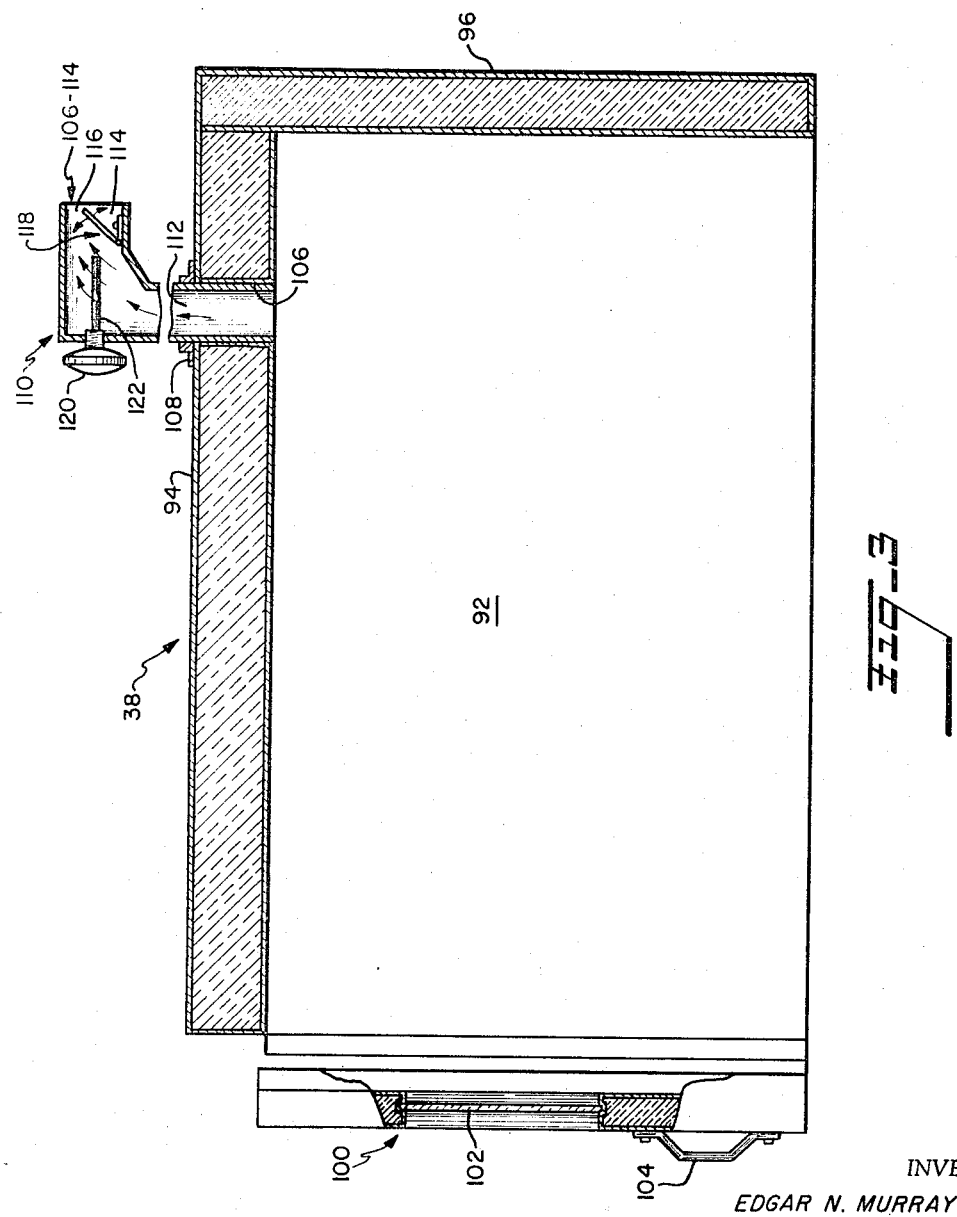
FIGURE 3 is a vertical section through the oven of the cooking unit.

Turning now to FIGURES 2 and 3, cooking unit 22 of the novel barbecue apparatus just described includes two major components, a heat basin 36 and an oven 38 disposed above the heat basin. Heat basin 36 houses drip pan 32 and supports heating unit 24, rack 30, and oven 38.

Heat basin 36 (see FIGURE 2) has an open top box-like configuration defined by insulated side walls 40 and rear wall 42, a sheet metal bottom wall 44, and an insulated front wall 46 which is relatively low compared to the rear and side walls so that the upper portion of the front of heat basin 36 is open, forming a passage through which the heated air can flow into cooking unit 22 from heating unit 24. The insulated walls of the heat basin 36 illustrated in FIGURE 2 each consist of a sheet metal casing 48 surrounding a fiberglass batt 50. This particular construction is not critical, however, and can be varied as desired.

The heat basin 36 just described is supported on four legs, each of which consists of a pipe 52 with a flange 54 of plate material fixed to its lower end. Short lengths of pipe or rod 56 having an outside diameter substantially equal to the inside diameter of legs 52 and fixed to the bottom wall 44 of heat basin 36 extend into the open upper ends of and interconnect legs 52 to the heat basin.

To add rigidity to the supporting structure just described, a pair of rodlike braces 58 are disposed between each pair of adjacent legs 52 in an X-like arrangement. Conventional connectors 60 fix the ends of rods 58 to legs 52.

The drip pan 32 housed in heat basin 36 is of sheet metal construction and has inwardly tapering side walls 62, which are of uniform width for a major portion of their length, inwardly tapering front and rear walls 64 and 66, and a generally flat bottom wall 68, to which drain pipe 34 is attached as by welding. That portion 72 of bottom wall 68 between drain pipe 34 and rear wall 66 is tapered upwardly with respect to the remainder of bottom wall 68.

Drip pan 32 is attached to the side wall 40 of heat basin 36 by screws 74 and is so oriented that bottom wall 68 slopes downwardly from the front of heat basin 36 to drain pipe 34. With the drain pan so oriented, bottom wall portion 72 also slopes downwardly from the rear of the heat basin to drain pipe 34. Consequently, any grease dripping into pan 32 flows toward and out drain pipe 34.

Fixed to the top of and extending around all four sides of heat basin 36 are angle irons 76 on which a spatter shield 78, grill 30, and oven 38 rest. Spatter shield 78 is formed from four identically configured panels 80, each of which has a vertically extending upper portion 82, a horizontally extending lip or flange 84, and an inwardly tapered lower portion 86. The four panels 80 are fixed in a rectangular configuration as by welding and supported on heat basin 36 with the lips 84 of the four panels 80 resting on the horizontal flanges of the angle irons 76 around the top of the heat basin and upper and lower panel portions 82 and 86 spaced inwardly of the oven walls.

Spatter shield 78 is preferably fabricated from stainless steel or like material which is heat resistant and from which grease and other foreign substances may readily be cleaned and is removable from cooking unit 22. The upper portion of spatter shield 78 formed by panel portions 82 intercepts and contains grease spattered from the meat on rack 30. The lower portion of the spatter shield, formed by panel portions 86, guides the grease rendered from the meat during the barbecuing process into drip pan 32.

Rack 30, as shown in FIGURE 2, consists of angle irons 88 at the front and rear of heat basin 36 and a plurality of parallel, spaced apart, side-by-side bars 90 extending between and fixed at their opposite ends to the two angle irons. Rack 30 is removably supported at the upper end of heat basin 36 with the horizontal flanges of angle irons 88 resting on lips 84 of the four panels constituting spatter shield 78.

With continued reference to FIGURE 2 and with reference also to FIGURE 3, the oven 38 supported on heat basin 36 is of boxlike configuration and has an open bottom and open front. Oven 38 has insulated side walls 92, an insulated top wall 94, and an insulated rear wall 96, all of which may be constructed in the manner discussed above in conjunction with the insulated walls of heat basin 36. Oven 38 rests on the horizontal flanges of the angle irons 76 at the top of heat basin 36, as shown in FIGURE 2. Stairstep-like sheet metal members 97, fixed to the lower edges of the side walls 92 and rear wall 96 of oven 38, have horizontally extending flanges 98 which engage the corresponding walls of heat basin 36, when oven 38 is lowered on it, to orient oven 38 on the heat basin and to provide a seal between the heat basin and oven which prevents gas from escaping.

The open front end of oven 38 is closed by an insulated door 100 (shown in the closed position in FIGURE 2 and disassembled and spaced from the oven in FIGURE 3). Oven door 100 is of conventional construction, including a panel of heat resistant glass 102, through which the interior of oven 38 can be observed, and a handle 104 for opening and closing the door. Door 100 is attached to oven 38 by conventional oven hinges (not shown). Since neither the details of such hinges nor the details of oven door 100 constitute part of the present invention, it is not believed necessary to describe them herein.

To permit a continuous flow of heated air through it, oven 38 is vented through an opening 106 in its upper wall 94 adjacent the rear of the oven. Fixed in vent opening 106 by collar 108 is a sheet metal vent stack 110 having a vertical inlet portion 112 and a horizontally extending discharge portion 114 terminating in an outlet opening 116, which may communicate with the ambient atmosphere or with an exhaust duct (not shown).

To control flow through oven 38, a damper 118 is mounted in vent stack exhaust portion 114. A thermometer 120, fixed to vent stack 110 with its probe 122 in vent stack exhaust portion 114, enables the operator to maintain the desired temperature in oven 38.

Referring now to FIGURES 2, 4, 6, and 9, heating unit 24, which together with cooking unit 22 constitutes barbecue apparatus 20, includes a firebox 26 and a blower 28, as mentioned above. Firebox 26, which may be made of builder plate, has a laterally extending rear wall 124 consisting of a first vertical member 126, a second vertical member 128 spaced below and inwardly of member 126, and a horizontal member 130 extending between and connecting vertical members 126 and 128.

Fixed to the bottom of member 128 is a horizontal, laterally extending bottom firebox wall 132. A vertically extending front firebox wall 134 is fixed to the front edge of bottom wall 132 in parallel, spaced relation to rear wall member 128. Above and aligned with member 134 is a second front wall member 136. The gap between front wall members 134 and 136 constitutes a discharge opening 138 for the cooking air heated in heating unit 24.

Figure 4:
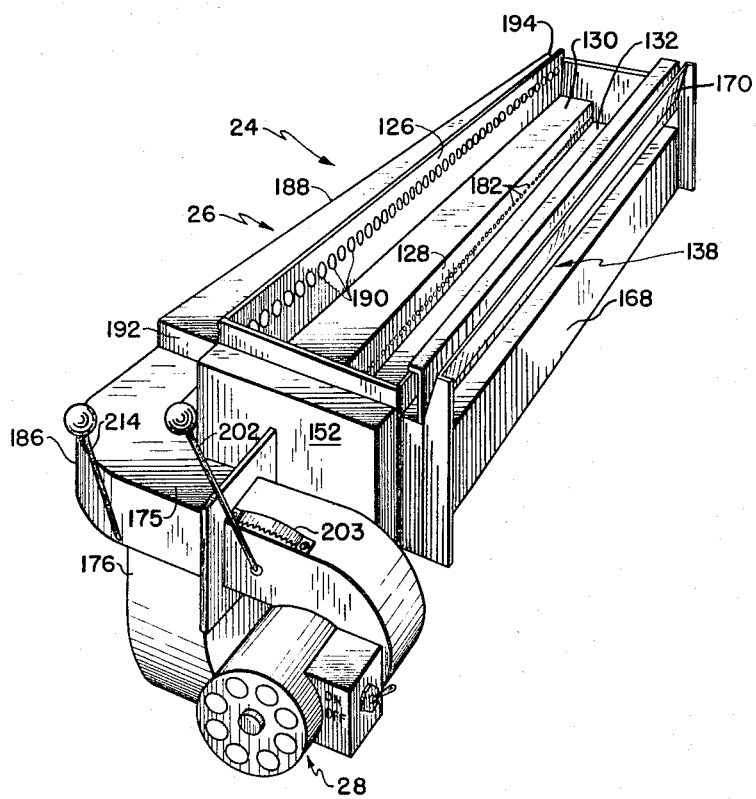
FIGURE 4 is a perspective view of the heating unit.

With reference now to FIGURES 2 and 4, communication between the outlet 138 from heating unit 24 and heat basin 36 is provided by a horizontal duct 140 formed of a pair of horizontal, spaced apart upper and lower plates 142 and 144, respectively, and a pair of vertically extending end plates 146 and 148. Upper and lower plates 142 and 144 are fixed, respectively, to the lower edge of firebox front member 136 and to the upper edge of firebox front wall member 134. End pieces 146 and 148 are fixed to upper and lower duct forming members 142 and 144 at opposite ends of firebox 26 so that the four members 142, 144, 146, and 148 cooperate to define the rectangularly sectioned duct 140.

The bottom and lower front portions of the firebox 26 just described are insulated by panels 149, each of which consists of a fiberglass batt 150 surrounded by a sheet metal casing 151. Panels 149 are fixed to the associated walls of the firebox by rivets or other fasteners.

The ends of firebox 26 are insulated with similar panels 152.

Firebox 26 is also provided with a removable, insulated cover 153 consisting of a lower rim 154 fixed as by rivets or screws to a boxlike outer member 156. A plate 158, supported on lower rim 154, holds a batt of fiberglass insulation 160 against the top wall 162 of cover outer member 156. A handle 164, attached in any convenient manner to outer member top wall 162, facilitates handling of the cover.

To detachably mount heating unit 24 on heat basin 36, laterally extending, vertical sheet metal members 166 and 168 are fixed to duct members 142 and 144, respectively. Fixed to the upper member 166 is a laterally extending, forwardly inclined bar or strip 170. When heating unit 24 is assembled to cooking unit 22 (see FIGURE 2), inclined member 170 and vertically extending member 166 engage opposite sides of depending leg 172 of the angle iron 76 extending across the front of heat basin 36 at the upper edge thereof. The bottoms of vertically disposed end members 146 and 148 and the horizontal flange of an angle iron 173 fixed to the lower portion of mounting member 168 rest on the top of heat basin front wall member 46. The weight of heating unit 24 tends to pivot it in a counterclockwise direction about the depending leg 172 of angle iron 76, moving the vertical member 168 at the front of the firebox into tight, sealing engagement with the front wall 46 of heat basin 36 (if desired, resilient sealing strips (not shown) may be located around the opening in the front of oven 38 to provide a gas tight seal between the oven and heating unit 24).

As discussed above, the blower 28 of heating unit 24 supplies combustion air to firebox 26 and blows air across the fire bed to heat it and then into cooking unit 22. Blower 28 is fixed to one of the two panels 152 insulating the ends of firebox 26, as by screws, and communicates, at its outlet end, with a sheet metal plenum 175. To supply combustion air to the fuel in firebox 26, a transition duct 176, which extends first laterally and then downwardly, is fixed between plenum 175 (see FIGURE 5) and a duct 178 (see FIGURES 2 and 6) which extends the length of firebox 26. As best shown in FIGURE 2, duct 178 is formed by rear wall members 128 and 130 of firebox 26 and by an L-shaped sheet metal member 180. From lateral duct 178, the combustion air supplied by blower 28 flows through small apertures 182, formed in vertical firebox wall member 128 adjacent firebox housing bottom wall 132 and the bottom of the fire bed in the firebox, the upper level of which is indicated by dotted line 184, creating a draft up through the fire bed. In one actual embodiment of the present invention, which can cook up to 200 pounds of meat at a time, apertures 182 are 0.25 inch in diameter and are spaced apart 1.00 inch on center.

To deliver the air to be heated to firebox 26, plenum 175 is connected by an elbow 186 to a sheet metal duct or plenum 188 fixed as by screws or rivets to rear wall member 126 of firebox 26. From plenum 188, the air to be heated flows through apertures 190 in wall member 126 into firebox 26 and across the fire bed in a generally horizontal direction, out discharge duct 140 into heat basin 36, and upwardly through oven 38 and out vent stack 110. Apertures 190 are substantially larger than apertures 182 and, in the embodiment of the invention referred to above, are 0.75 inch in diameter and are spaced apart on 1.25 inch centers.

Plenum 188 is of substantially uniform depth; but, to insure a uniform distribution of air through apertures 190, the plenum is tapered in width from the end 192 at which the air enters to the end 194 at the opposite end of the heating unit. In the embodiment of the invention referred to above, for example, plenum 188 is 2.50 inches wide at the end where the air enters and 1.0 inch wide at the opposite closed end and is 40 inches long.

Referring now to FIGURES 5 and 7A, the volume of air flowing into heating unit 24 and the proportioning of this air between plenum 188 and duct 178 is controlled by valves 196 and 198. Valve 196 is a conventional butterfly valve in the outlet of blower 28 and is mounted on a shaft 200 journalled on the side walls of the blower housing. Exteriorly of the blower, shaft 200 is bent at right angles to its valve supporting portion to provide an operating lever 202. By moving lever 202 forward or backward, the cross sectional area of the blower outlet may be varied to change the total volume of air supplied by the blower.

A bracket 203 with a serrated surface mounted on blower 28 adjacent lever 202 retains the lever in the position to which it is moved.

Valve 198, as shown in FIGURE 8, is formed from sheet metal and has a flat main body portion 204 and a raised body portion 206 which is integral with and parallel to but displaced from main body portion 204. At one end, valve body 204 is turned back on itself to provide a bore 208 through which a shaft 210 (see FIGURE 7A) extends and is fixed thereto as by rivets. Shaft 210 is journalled in the side walls 212 of plenum 175 and (see FIGURE 6) is bent, exteriorly of plenum 175, to form an operating handle 214. Sufficient friction can be provided in the journal portions to maintain this valve 198 in adjusted position or, if desired, a detent bracket similar to 203 can be used.

With operating handle or lever 214 in the position shown in FIGURES 5 and 7B, for example, valve 198 extends across the inlet 216 to transition duct 176; and the valve's main body portion 204 abuts the bottom wall 218 of plenum 175 on opposite sides of entrance 216 and partially seals the inlet. However, as best shown in FIGURE 7B, there is a gap between the plenum bottom wall 218 and the edges of raised valve body portion 206 so that, even with valve 198 closed, there is a flow of air from plenum 175 through transition duct 176, duct 178, and apertures 182 into the bottom of firebox 26 to support the combustion of the fuel therein.

To start the fire in firebox 26, cover 153 is removed; and the firebox filled with fuel such as charcoal briquettes, hickory coals, or the like to a depth preferably not exceeding that shown by dotted line 184 in FIGURE 2. Valves 196 and 198 are then adjusted to the position shown in FIGURE 7A so that there is a maximum flow from blower 28; and most of the air delivered by the blower is diverted from plenum 175 through transition duct 176, lateral duct 178, and apertures 182 into the bottom of the bed of fuel. The fire is then lighted. The forced draft through the fire bed will very quickly cause the briquettes or coals to become red hot.

Valve 198 is then adjusted to the position shown in FIGURE 7B. In this position, there is a minimum flow of combustion air through ducts 176 and 178; and the major portion of the air delivered by blower 28 is diverted through duct 186 into plenum 188 and flows through apertures 190 horizontally across the fire bed where it is heated to a temperature of several hundred degrees and entrains combustion products. The heated air flows through discharge duct 140 into heat basin 36 of the cooking unit and circulates upwardly through the cooking unit 38, heating the meat on rack 30 by convection, and then passes out vent duct 110.

To heat the comestibles on rack 30 requires only a flow of air so low as to be almost imperceptible after the oven is initially heated. Therefore, when the oven reaches the desired temperature, valve 196 is adjusted as shown in FIGURE 7C to decrease the volume of air supplied by blower 28; and, therefore, the volume of heated air circulated into cooking unit 22. By varying the setting of valve 196, oven 38 can be maintained at the desired temperature as indicated by thermometer 120 in vent stack 110.

As discussed above, the novel heating unit 24 of the present invention may be employed with cooking units of different types. FIGURE 9 illustrates the use of heating unit 24 with an open pit barbecue 220 of conventional construction and including a pit 222 in which a fire is normally built and bars 224 adjacent the top of the pit on which the meat to be barbecued is laid.

In practicing the present invention, an opening 226 is formed in one wall of pit 222 below bars 224 and heating unit 24 is mounted in the opening in the manner described above in conjunction with the embodiment of FIGURE 1. This embodiment of the present invention operates in substantially the same manner and has the same advantages over the prior art as the previously described embodiment of this invention.

FIGURE 10 shows a portable grill 230 of the home use type equipped with a heating unit 24 in accord with the principles of the present invention and mounted to direct heat up through rack or grate 231. This embodiment of my invention also has the advantages of and operates in the manner described previously. Another advantage of this embodiment, as mentioned previously, is that it can be used indoors because of the complete and smokeless combustion and the absence of burning fat.

Figure 11:
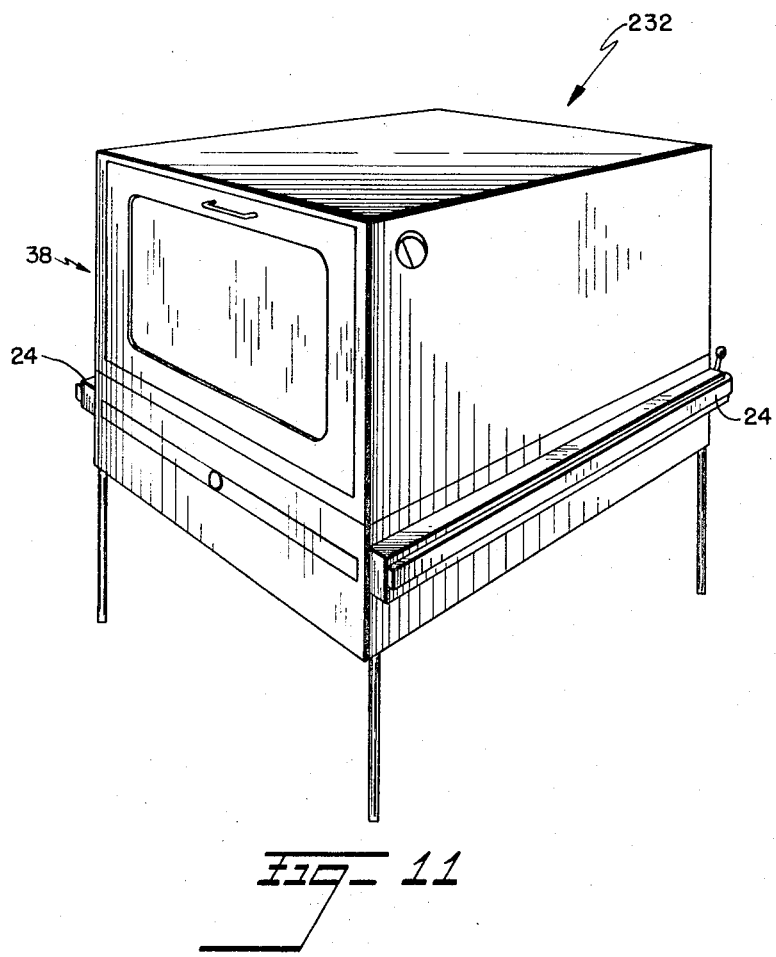
FIGURE 11 is a perspective view of a commercial oven type barbecue apparatus constructed in accord with principles of the present invention and equipped with two indirect heating units.

For large commercial applications the size of heating unit 24 may be increased; or plural heating units 24 may be employed. FIGURE 11, for example, shows a commercial oven type barbecue apparatus 232 equipped with two heating units 24, one at each side of a cooking unit 234 of the type described previously. Dual heating units can also be employed with other types of cooking units such as open pits, grills, and the like, if desired.

Although the apparatus described above is particularly useful for barbecuing meat, this is by no means the only application of this apparatus. For example, the novel oven type cooking apparatus of FIGURES 1 or 11 may be used for roasting or for baking bread or for any other type of cooking for which a conventional oven is employed. The designation of the invention disclosed herein as "barbecue apparatus" is therefore not intended to be limiting, but is meant to exemplify the uses to which the present invention may be put.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A heating unit for cooking apparatus, comprising:
(a) an elongated housing having first and second side walls adapted to have a fuel such as charcoal or the like burned therein;
(b) an air supply blower at one end of said housing;
(c) a first combustion air supply plenum at the first side wall of said housing extending substantially the length of said housing;
(d) a row of apertures in said first wall adjacent the bottom of said housing providing communication between the interiors of the combustion air supply plenum and the housing at the bottom of the latter;
(e) a second cooking air plenum at said housing first side and extending substantially the length thereof, said cooking air plenum decreasing in width from said housing one end to the opposite end thereof, whereby the cross sectional area of said plenum continuously decreases from one to the other of said housing ends;
(f) a second row of apertures in said first housing side wall providing fluid communication between the interiors of said second plenum and said housing, the second row of apertures being parallel to and spaced from the first row and the apertures in the second row being substantially larger than those in the first row;
(g) a third outlet plenum at said housing one end communicating with the outlet of said blower;
(h) a first air duct connected between said third plenum and the end of said second plenum nearest said housing one end;
(i) a second air duct connected between said third plenum and the end of said first plenum nearest said housing one side;
(j) means including a first valve for varying the total flow of air from the outlet of the blower into the third plenum;
(k) means including a second valve in said third plenum for proportioning the flow of air from the third plenum into said ducts between said ducts; and
(l) an air outlet from said housing in the second side wall thereof extending substantially the length of said housing.

2. The heating unit as defined in claim 1, wherein:
(a) said third plenum has a flat wall to which said second duct is fixed, said wall having an aperture therein providing fluid communication between the interiors of the third plenum and the second duct;
(b) said second valve is pivotally fixed to said plenum wall adjacent said aperture and is movable against said wall, said valve having a main body portion large enough to cover said aperture; and
(c) said valve having a second body portion integral with the main body portion and an edge parallel to and slightly spaced from the edge of the main body portion, whereby, when said main body portion is in contact with said plenum wall, said second valve portion edge is spaced from said plenum wall to allow air to flow at a minimum rate from said third plenum into said second duct through the opening between said second valve portion edge and said plenum wall.

3. A heating unit for cooking apparatus, comprising:
(a) an elongated housing adapted to have a fuel such as charcoal or the like burned therein;
(b) an air supply blower at one end of said housing;
(c) a first combustion air supply plenum disposed on one side of and extending substantially the length of said housing;
(d) an apertured wall providing fluid communication between the interior of said first plenum and the interior of the housing;
(e) a second air supply plenum fixed to the same side of said housing said first plenum and extending substantially the length of said housing parallel to the first plenum;
(f) apertures in the housing wall above the apertures providing fluid communication with the first plenum providing fluid communication between the second plenum and the interior of the housing and directing the flow of air laterally across the housing;
(g) duct means providing fluid communication from the outlet of said blower to said first and second plenum; and
(h) an air outlet for the air flowing from the second plenum laterally across said housing in the side of said housing opposite that in which said apertures are formed, whereby the air discharged into said housing through said apertures flows directly across said housing and through said outlet.

4. A heating unit for cooking apparatus, comprising:
(a) a firebox;
(b) a blower;
(c) first distribution means for forcing combustion air into said firebox;
(d) second distribution means for forcing air through said firebox in a path in which said air is heated by burning fuel in said firebox;
(e) first damper means for proportioning the flow of air from the blower between said first and second distribution means, said first damper means being selectively operable to vary said proportion; and
(f) selectively operable second damper means for varying the flow rate of air from said blower;
(g) said first and second damper means each being adjustable independently of the other of said damper means.

5. A heating unit for cooking apparatus, comprising:
(a) an elongated housing;
(b) an air supply blower;
(c) a first combustion air supply plenum extending substantially the length of said housing;
(d) means providing fluid communication between the interiors of the combustion air supply plenum and the housing over the length of the housing and at the bottom of the latter;
(e) a second cooking air plenum extending substantially the length of the housing;
(f) means providing fluid communication between the interiors of said second plenum and said housing over the length of said housing;
(g) a third plenum communicating with the outlet of the blower;
(h) duct means connecting said third plenum to said first and second plenums, respectively;
(i) means including a first valve for varying the total flow of air from the blower into the third plenum;

(j) means including a second valve in said third plenum for proportioning the flow of air from said third plenum into said duct means between said duct means; and (k) an air outlet from said housing extending substantially the length thereof, said outlet being located across said housing from the cooking air plenum.

References Cited

UNITED STATES PATENTS

| | | | |
|---|---|---|---|
| 346,763 | 8/1886 | McDowell | 126—273 |
| 777,454 | 12/1904 | Walsh | 110—72 |
| 1,595,846 | 8/1926 | Wood | 999—446 |
| 2,143,994 | 1/1939 | McGlone | 126—1 |
| 2,755,851 | 7/1956 | Dow et al. | 158—114 |
| 2,790,380 | 4/1957 | Shryack | 99—427 |
| 3,191,590 | 6/1965 | Haley | 126—19 |

FOREIGN PATENTS

| | | |
|---|---|---|
| 212,993 | 1/1961 | Austria. |
| 61,873 | 1/1940 | Norway |

FREDERICK KETTERER, *Primary Examiner.*